Figure 1:
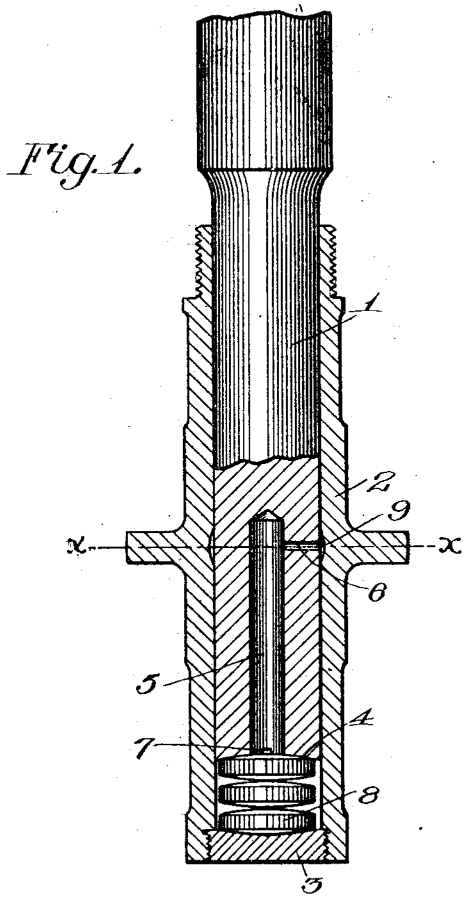

D. M. COOPER.

SELF LUBRICATING BEARING.

APPLICATION FILED APR. 26, 1911.

1,094,535.

Patented Apr. 28, 1914.

Inventor

DANIEL M. COOPER

Witnesses

Nelson Copp

H. E. Stonebraker.

By Church & Rich his Attorneys

UNITED STATES PATENT OFFICE.

DANIEL M. COOPER, OF ROCHESTER, NEW YORK, ASSIGNOR TO AMERICAN LAUNDRY MACHINERY COMPANY, OF CINCINNATI, OHIO, A CORPORATION OF OHIO.

SELF-LUBRICATING BEARING.

1,094,535. Specification of Letters Patent. Patented Apr. 28, 1914.

Application filed April 26, 1911. Serial No. 623,546.

*To all whom it may concern:*

Be it known that I, DANIEL M. COOPER, of Rochester, in the county of Monroe and State of New York, have invented certain new and useful Improvements in Self-Lubricating Bearings; and I do hereby declare the following to be a full, clear, and exact description of the same, reference being had to the accompanying drawings, forming a part of the specification, and to the reference numerals marked thereon.

The present invention relates to a self-lubricating bearing, and it has for its object to provide a bearing especially adapted for use in connection with vertically arranged rotating elements, where considerable downward thrust is set up by the weight of the rotating element and the parts supported thereby. To these and other ends the invention consists in certain improvements and combinations of parts all as will be hereinafter more fully described, the novel features being pointed out in the claim at the end of the specification.

Figure 2:
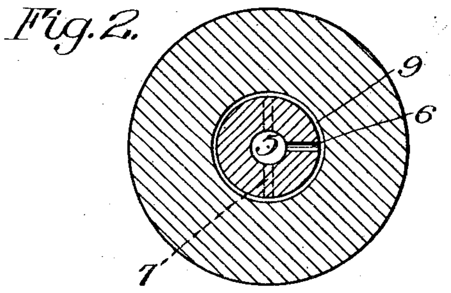

Figure 1 is a vertical sectional view showing one embodiment of my invention, and Fig. 2 is a transverse section on the line *x*—*x* of Fig. 1.

Similar reference numerals in the several figures indicate similar parts.

In spindle bearings, or thrust bearings of the character shown, generally, difficulty has been encountered due to the fact that the wear-surfaces are quickly rendered unfit for use, owing to the comparatively great weight exerted at the bearing point, and in providing effective means for maintaining the parts constantly in a sufficiently lubricated state. To this end I provide the bearing with a series of removable and interchangeable antifriction devices which afford wear-surfaces that may readily be replaced, and are arranged so as greatly to reduce the friction between the parts. The antifriction devices are positioned between the rotating element and its support, and are lubricated by the action of the rotating element which forces the lubricating fluid upwardly to a point where it is directed inwardly, and thence downwardly to the antifriction devices and outwardly to the periphery of the rotating element, and so on continuously as long as there is a supply of the lubricating fluid.

In the embodiment of the invention, as herein illustrated, a vertically disposed rotary member or shaft 1, is disposed within a support, or step 2, the end 3 of which may be removably secured to the body portion as shown. The lower end of the shaft 1 is concaved as shown at 4, and extending vertically from the center of the concaved portion 4 is an opening 5 which communicates near its upper end with the periphery of the shaft by means of an opening 6, preferably extending laterally from the opening 5. Arranged transversely of the end of the shaft 1 is a recess 7, which extends from the central opening 5 to the periphery of the shaft for a purpose which will now be made clear.

The upper face of the end portion 3 of the support 2 is preferably concave to receive an antifriction device, here shown in the form of a disk 8 having oppositely disposed convex surfaces, and arranged thereabove are two similarly formed antifriction devices, the rotary member or shaft resting on the upper surface of the uppermost disk, and having its concave end conforming to the convex surface of the disk. The antifriction devices are preferably formed of hardened steel, although they may be constructed of any sufficiently hard and wear resisting material. By providing a series of antifriction devices, as shown, the greatest wear takes place on the central one of the series, the uppermost disk usually rotating with the shaft, while the lowermost one remains substantially stationary in the support. When the central disk has been excessively worn, it may be placed at the bottom, the lowermost one being transferred to the top and the uppermost one arranged in the center, in this way enabling the bearing to continue performing efficient service for a much longer time without requiring the expense of additional wearing parts.

Arranged interiorly of the support 2, and so as to surround the shaft 1 at a point in substantially the same plane with the laterally extending opening 6, there is provided a recess 9, which collects the lubricating fluid in its travel upwardly around the shaft 1, and serves to direct it inwardly through the opening 6 whence it falls by gravity to the bottom of the shaft 1, and is carried through the recess 7 to the periphery of the shaft, thence upwardly and so on, giving a constant circulation during the portion of the shaft [illegible] of which [illegible] fluid constantly [illegible] around its periphery. Without the [illegible] of the [illegible] a considerable [illegible] of the lubricating fluid would be [illegible] in an upward direction [illegible] thrown out at the top of the [illegible] continuance.

In the assembling of the parts, the anti-friction devices are first inserted [illegible]

[illegible] anti-friction devices.

[illegible] between the [illegible] rotary shaft arranged [illegible] concave lower [illegible] friction devices [illegible] provided with smooth [illegible] convex surfaces, said anti- [illegible] disposed between the [illegible] the bottom of the [illegible] vertically extending [illegible] the central part [illegible] anti-friction de- [illegible] of said opening [illegible] plate above the afore- [illegible] the shaft [illegible] opening of [illegible] the lu- [illegible] in all [illegible]

DANIEL M. COOPER.

[illegible]